United States Patent [19]

Hansen et al.

[11] Patent Number: 5,512,810
[45] Date of Patent: Apr. 30, 1996

[54] VARIABLE SPEED CONTROL FOR A HAND-HELD ELECTRIC POWER TOOL

[75] Inventors: James E. Hansen, Oak Creek, Wis.; Jeffery L. Henderson, Somerville, Ala.; James R. Jaeschke, Waukesha, Wis.

[73] Assignee: Eaton Corporation, Cleveland, Ohio

[21] Appl. No.: 250,080

[22] Filed: May 27, 1994

[51] Int. Cl.$^6$ .................................................. H02P 7/00
[52] U.S. Cl. ......................... 318/800; 388/820; 388/917; 388/919; 323/324
[58] Field of Search ..................... 318/799–802; 388/917–920, 937, 820; 323/324; 327/455, 457

[56] References Cited

U.S. PATENT DOCUMENTS

| | | | |
|---|---|---|---|
| 3,832,612 | 8/1974 | Woods | 318/788 |
| 3,897,595 | 7/1975 | Fearno | 318/762 |
| 3,936,708 | 2/1976 | Dummer | 318/249 |
| 4,031,458 | 6/1977 | Ichikawa | 323/36 |
| 4,052,624 | 10/1977 | Hamstra | 307/252 B |
| 4,157,491 | 6/1979 | Werner et al. | 318/798 |
| 4,158,796 | 6/1979 | Kosak et al. | 318/245 |
| 4,361,798 | 11/1983 | Tolmie, Jr. | 323/324 |
| 4,422,030 | 12/1983 | McAllise | 318/779 |
| 4,528,456 | 7/1985 | Harris | 307/31 |
| 4,703,248 | 10/1987 | Kühnemundt et al. | 323/300 |
| 4,914,327 | 4/1990 | Dekker | 307/632 |
| 5,247,230 | 9/1993 | Michaud | 318/17 |

FOREIGN PATENT DOCUMENTS

| | | | |
|---|---|---|---|
| 1434474 | 5/1976 | Germany | H02P 7/28 |
| 1442487 | 7/1976 | Germany | H02P 7/74 |
| 58-3583A | 1/1983 | Japan . | |

OTHER PUBLICATIONS

SCR Manual, General Electric Company, 1979, pp. 252–254.
General Electric Application Note No. 200.35, p. 8.

*Primary Examiner*—William M. Shoop, Jr.
*Assistant Examiner*—Brian Sircus
*Attorney, Agent, or Firm*—Quarles & Brady

[57] ABSTRACT

A power tool has a variable speed control circuit that comprises a user switch, a motor and a thyristor connected in series between a pair of power supply terminals. A manually variable resistor is connected between a first electrode of the thyristor and a circuit node. A capacitor is coupled between the circuit node and the second thyristor electrode. A bleed-off resistor is connected between second thyristor electrode and the circuit node to provide a path for discharging the capacitor when the user switch is open. A semiconductor trigger device, such as a diac or silicon trigger switch, couples the circuit node to the thyristor gate electrode. The circuit operation ensures that the capacitor charges from substantially the same voltage level at the start of each half-cycle during which the thyristor is to be turned on.

10 Claims, 2 Drawing Sheets

VARIABLE SPEED CONTROL FOR A HAND-HELD ELECTRIC POWER TOOL

BACKGROUND OF THE INVENTION

The present invention relates to variable speed controls for electric motors; and more particularly to such controls for regulating the speed of hand-held power tools which are driven by an electric motor.

Hand-held power tools, such as electric drills and drywall screwdrivers, utilize an electric motor to power a bit which either drills a hole or turns a screw. Such power tools often incorporate a trigger which is manually operated by the user of the tool with the speed of the motor being controlled by the degree to which the user presses the trigger. This allows the speed of the drill or the screw bit to be varied depending upon the particular application for the tool. For example, the speed of a drill bit can be controlled to correspond to the hardness of the material being drilled.

FIG. 1 shows a typical circuit used in previous hand-held power tools to control the speed of an electric motor 11. When switch 12 closes, capacitor 13 charges at an adjustable rate determined by the position of variable resistor 14 which is controlled by the user. When the voltage across capacitor 13 reaches a threshold potential of diac 15, that device fires becoming conductive and applying a trigger potential to the gate electrode G of a triac 16. When triggered, the triac 16 becomes conductive applying electricity from source 18 to the motor 11. Depending upon the charge rate of capacitor 13, the triac 16 turns on at different phase angles during each half-cycle of the alternating current supplied by source 18. The sooner the triac turns on during each half-cycle, the greater the magnitude of current applied to the motor 11 and thus the faster the motor turns.

This basic motor speed control circuit 10 has a drawback with respect to its use in hand-held power tools. Assuming that the power tool has been turned off for a relatively long time, the capacitor 13 will have been fully discharged due to current leakage through the diac 15 and triac 16. In addition, the capacitor 13 has intrinsic resistance which provides a current leakage path. As a result, the capacitor 13 will begin charging from zero volts when the switch is closed and continues to charge until reaching the firing potential of the diac 15. When conventional diacs fire, their conduction characteristic is such that all of the voltage across the capacitor 13 is not discharged. For example, a typical diac fires at 30-40 volts and once conductive, the voltage across the capacitor 13 drops to 20 volts where it remains through the rest of that half-cycle of the alternating supply voltage.

When the polarity of the alternating supply voltage reverses during the next half-cycle, the capacitor does not begin charging from zero volts, but rather from the residual voltage of opposite polarity from the previous half-cycle. For example, at the end of a positive half-cycle, a positive 20 volts remains across the capacitor 13. When the supply voltage polarity reverses during a negative half-cycle, the residual positive 20 volt charge on the capacitor must first be overcome before the capacitor can charge a negative voltage level at which the diac 15 fires. Thus, after the first half-cycle, a longer time is required between the zero crossing of the alternating supply voltage from source 18 and the triggering of the triac 16.

Because the initial current through the motor may be significantly greater than desired or expected by the user, the speed of the motor may increase abruptly when first turned on. Such an abrupt jump in speed can cause the power tool to "kick" in the user's hand. When the tool kicks, the drill bit may move away from the desired location for the hole or the screwdriver bit may jump out of the grooves in the head of the screw.

A similar kick can occur when the power tool is rapidly cycled off and on. As noted previously, current leakage in various components when the power tool is turned off slowly discharges any voltage remaining across capacitor 13. Normally, this leakage current is very small and the discharge occurs over a relatively long period of time. Therefore, rapid cycling of the power tool between off and on, as frequently occurs with a power tool used to drive dry-wall screws, can take place before residual voltage across capacitor 13 has discharged completely.

The amount of that residual voltage is dependent upon the point in the half-cycle of the alternating supply voltage at which the switch 12 was opened. In the worst case situation, the switch 12 is opened just before the voltage across the capacitor 13 has reached the firing potential of diac 15. In this situation if the switch 12 then is closed a very short time later during a half-cycle having the same polarity as the half-cycle when the switch opened, a very short amount of time will elapse before the voltage across capacitor 13 reaches the firing potential of the diac. Thus, the diac may fire almost immediately upon closure of switch 12 causing the triac 16 to apply a relatively large magnitude of current through motor 11 during that half-cycle, even though the user has placed variable resistor 14 in a position which should normally apply a much smaller magnitude of current to the motor. During subsequent half-cycles of the supply voltage that smaller intended current level will be applied. Thus, the motor possibly can start at a relatively high initial torque before it subsequently is powered at a desired speed during the next half-cycle of the supply voltage. Such operation in this worst case creates a very abrupt change in the torque of the motor which also causes jumping of the drill bit or screwdriver bit. This abrupt change in the applied motor current is very undesirable in hand-held power tools.

Another problem often encountered in thyristor based, full-wave phase control circuits is called "hysteresis" wherein the power tool motor stalls or turns off at a different setting of the variable resistor 14 than the setting at which the motor initially turned on. This phenomenon is well known and is described in detail at pages 252-255 of the book entitled SCR Manual Including Triacs and Other Thyristors, 1979 published by the General Electric Company and Prentice-Hall, Inc. Thus once the motor starts the user is able to reduce its speed by backing off the setting of the variable resistor. This phenomenon is commonly referred to as "snap-on" since a single time constant phase control circuit usually has to be started at a higher phase conduction angle that it can run at once started. The snap-on operation is disadvantageous since the motor must start at a higher speed than perhaps is desired by the user. In the past, snap-on was cured by a dual time constant control circuit which also suffered from the motor kick problem.

The power tool market is very cost-competitive and sophisticated electronic circuit solutions to these problems may have an adverse impact on the cost of the power tool. Therefore, it is highly desirable to solve the problems with a minimal number of additional components that are relatively inexpensive.

SUMMARY OF THE INVENTION

An object of the present invention is to provide a variable speed control circuit for an electric motor driven hand-held power tool which alleviates the motor kick upon start up.

Another object is to provide a solution to the motor kick problem which requires a minimal number of additional components and additional components which are relatively inexpensive, so that the solution will not increase the cost of the power tool significantly.

These objectives are fulfilled in a hand-held power tool that has a variable speed control circuit which comprises a switch, motor and a thyristor connected in series between a pair of power terminals. The thyristor has first and second electrodes with a conduction path therebetween connected in series with the motor and the switch. Conductivity of the conduction path is controlled by current applied to a gate electrode of the thyristor.

A semiconductor trigger device has a first terminal directly connected to the gate electrode of the thyristor and a second terminal directly connected to a trigger node of the circuit. A manually variable resistor is connected between the first electrode of the thyristor and the trigger node. A capacitor is directly connected between the second electrode of the thyristor and the trigger node. A bleed-off resistor is coupled between the second electrode and the trigger node to provide a path for discharging the capacitor when the switch is open. This path ensures that the capacitor will start charging from substantially zero volts when the power tool initially turned on.

In one embodiment of the present variable speed control circuit, a triac is used as the thyristor. In this case the semiconductor trigger device may be a bilateral silicon trigger switch or a silicon bidirectional switch, which has a relatively small voltage drop thereacross in the conductive state. Preferably this voltage drop is less than two volts.

In another embodiment of the variable speed control circuit, the thyristor is a silicon controlled rectifier (SCR). With an SCR, the semiconductor trigger device need only be a unidirectional device such as a silicon unilateral switch, but a bidirectional trigger device can be used although firing in only one direction is required. In this latter embodiment a diode is connected across the charging capacitor so that the diode is forward biased to discharge the capacitor when the SCR is reverse biased.

The small voltage drop across the semiconductor trigger device in the triac circuit ensures that the capacitor discharges to substantially zero volts when the thyristor is conductive. Similarly, in the SCR circuit the diode provides a path which discharges the capacitor during the half cycles of the supply voltage when the SCR is reverse biased. This results in the capacitor charging from substantially the same voltage level during every half-cycle of the supply voltage in which the thyristor will be triggered.

DESCRIPTION OF THE PREFERRED EMBODIMENT

Figure 1:
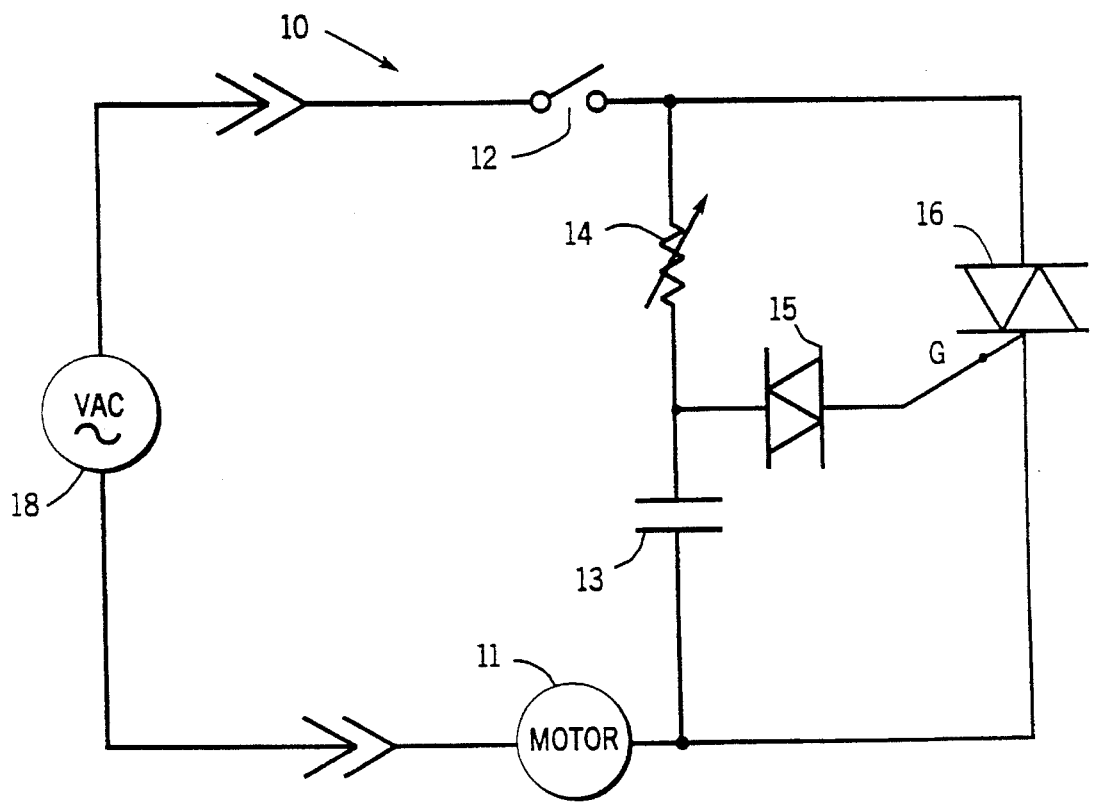
FIG. 1 is a schematic diagram of a prior art variable speed control for an electric power tool.
Figure 2:
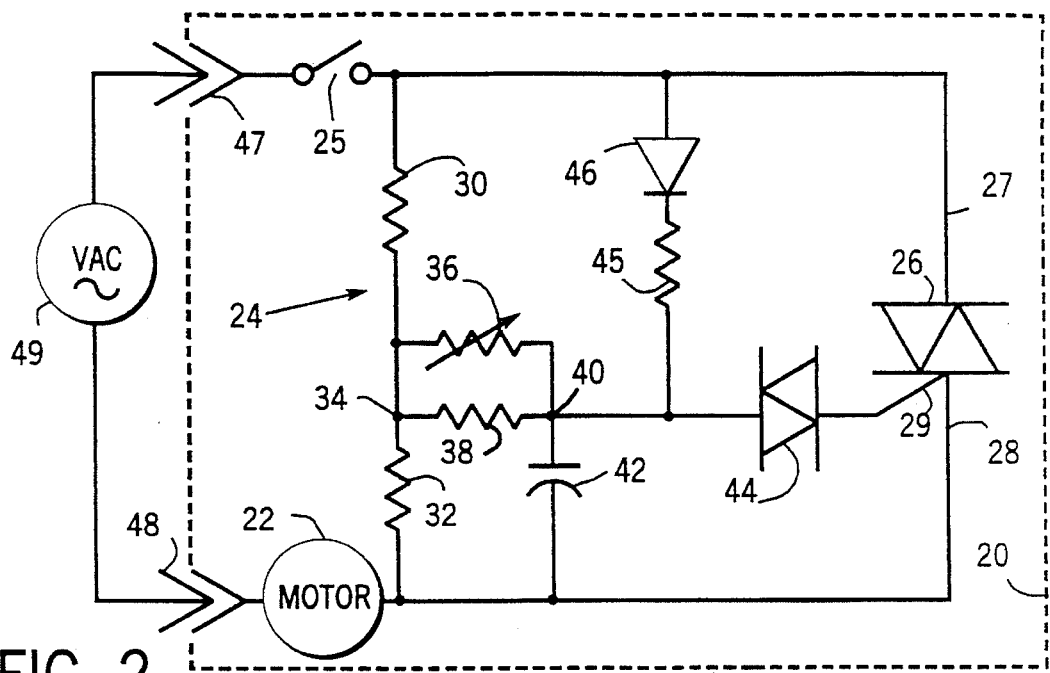
FIG. 2 is a schematic diagram of a control circuit according to the present invention for varying the speed of an electric motor of a hand-held power tool.

With reference to FIG. 2, a hand-held power tool 20 is driven by an electric motor 22 that is controlled by a variable speed control circuit 24. Control circuit 24 includes a switch 25 that is manually operated by the user of the power tool to turn on and off the motor 22. The switch 25 is coupled electrically to the motor 22 by a triac 26 having a first electrode 27 connected to the switch and a second electrode 28 connected to one terminal of the motor. The triac 26 also has a gate electrode 29, the voltage potential at which determines the conductivity through the triac between the first and second electrodes 27 and 28.

A voltage divider, formed by a first resistor 30 and a second resistor 32, is connected directly across the two electrodes 27 and 28 of the triac 26. The first and second resistors 30 and 32 are connected in series at a first node 34 therebetween. The first node 34 is connected directly to a second node 40 by a variable resistor 36. The variable resistor is manually operable by the user of the power tool 20. As is conventional with hand-held power tools, the switch 25 and the wiper of variable resistor 36 are connected mechanically to a trigger on the power tool. A capacitor 42 is directly connected between the second node 40 and the second electrode 28 of triac 26.

The variable resistor 36 and capacitor 42 form an RC circuit which has a time constant that varies depending upon the resistance setting of the variable resistor 36. The time constant is adjusted at the factory during manufacture of the power tool by a trimmer resistor 38 that extends between the two nodes 34 and 40 in parallel with variable resistor 36. That adjustment of the RC circuit operation compensates for component value variation in the control circuit so that uniform operation is achieved among the power tools being manufactured. Specifically, the trimmer resistor 38 is adjusted so that the motor will operate at approximately the same speed for a given position of the variable resistor 36.

Resistors 30 and 32 act as a voltage divider which reduces the supply voltage applied across the variable resistor 36 and help prolong its life. This is particularly important in a power tool that operates with a 220 volt source of electricity.

The second node 40 is connected to the gate electrode 29 of triac 26 by a semiconductor trigger device, such as a bilateral silicon trigger switch or a silicon bidirectional switch. For example, a bilateral silicon trigger switch 44, such as type HS-20 manufactured by Teccor, is used in the illustrated embodiment. Regardless of the type of semiconductor trigger device which is used, there must be a relatively low voltage drop across the device in the conductive state. That low voltage drop is required to remove substantially all of the charge previously built-up in capacitor 42. Thus many conventional trigger devices, such as diacs, can not be used in this circuit.

The second node 40 is connected to the first electrode 27 of the triac 26 by a diode 46 and a third resistor 45 connected in series. The diode 46 is connected so that it will be forward biased when the voltage at the first triac electrode 27 is positive with respect to the voltage at second node 40. Diode 46 and resistor 45 provide a mechanism which eliminates the "snap-on" problem encountered in certain applications of the motor speed control circuit. As noted previously, the snap-on effect results from a hysteresis in the operation of the control circuit wherein the power tool 20 turns off at a different setting of the variable resistor 36 than the setting at which the power tool initially turned on. The present control circuit provides a slightly different capacitor charge rate during positive and negative half-cycles which significantly reduces the hysteresis effect.

The control circuit 54 has a pair of input terminals 47 and 48 such as is provided by a standard electric plug for power tool 20. The power terminals 47 and 48 are employed to connect the power tool to a source 49 of alternating electric current at either 110 or 220 volts.

The control circuit 24 operates in a manner that minimizes abrupt initial torque that could produce a kick of the power tool in the user's hand. When the user of the power tool 20 closes switch 25, capacitor 42 begins charging at a time constant determined by the value of the capacitor and the user's setting of the variable resistor 36. The capacitor will have been fully discharged prior to the closure of switch 25 and thus initially charges from zero volts. For explanation purposes, also assume that the supply voltage from source 49 has just commenced a positive half-cycle when switch 25 closes. Therefore, the voltage at the second node 40 will begin to increase in a positive direction and continues to increase until reaching the firing potential of the bilateral silicon trigger switch 44. Reference herein to the voltage and changes in voltage at the second node 40 and across capacitor 42 are with reference to the second electrode 28 of triac 26.

The firing of the bilateral silicon trigger switch 44 discharges current into the gate electrode 29 which switches the triac 26 into a conductive state applying electric current through the motor 22 for the remainder of the half-cycle of the supply electricity. When the alternating current goes to zero, the triac 27 automatically turns off.

As noted previously, the bilateral silicon trigger switch 44 used as the semiconductor trigger device has the specific characteristic that once triggered, it becomes very conductive having a low voltage drop across the device, which preferably is about two volts or less and substantially less than the firing voltage. The residual voltage across the capacitor when the triac turns off will equal the voltage drop across the trigger device in the conducting state plus a slight gate to cathode voltage drop of the thyristor. At supply line voltages of 110 volts or more, this very small residual voltage level across capacitor 42 can be considered equivalent for all practical purposes to the initial zero voltage level when the switch 25 closed. A residual capacitor voltage of two volts or less is substantially equal to zero volts with respect to the firing voltage of the semiconductor trigger device.

During the next half-cycle of the supply line voltage from source 49, a negative half-cycle in the present example, the voltage at second node 40 initially changes in the negative direction. Initially, the small positive voltage level produced by the residual voltage across capacitor 42 decreases to zero and then the voltage increases negatively until reaching the negative firing potential of trigger device. However, since the residual voltage level is substantially the same as the initial zero volt level, approximately the same amounts of time are required during this half-cycle and the first half-cycle for the capacitor to charge to the firing potential of bilateral silicon trigger switch 44. Thus, the triac 26 will be fired at substantially the same phase angle during the second half-cycle of the supply line voltage as it was fired during the first half-cycle. Thus, substantially the same magnitude of electric current will be applied through the motor 22 during both half-cycles and the torque produced by the motor will not jump abruptly as occurred occasionally in power tools operated by previous variable speed control circuits. Indeed, the first half-cycle conduction time typically will be smaller than during normal running. It should be noted that during each subsequent half-cycle of the supply line voltage, the charging will commence from a relatively low opposite polarity voltage across the capacitor 42.

With the present control circuit, a somewhat longer RC time constant is required for a given phase angle than with conventional circuits because the charging during each half-cycle occurs from near zero volts rather than a more significant opposite polarity, due to the residual voltage on capacitor 42.

The present control circuit 24 also alleviates the problem with conventional devices that resulted from charge remaining on capacitor 42 after the power tool was turned off. When switch 25 is opened by the user, resistors 32, 36 and 38 form a path for discharging the residual voltage across capacitor 42. Specifically, a bleed-off resistor 32 provides a path which more rapidly bleeds away any residual capacitor charge when the circuit is turned off than occurred in previous devices which had only current leakage through the trigger switch 44 and triac 26 and through the capacitor itself.

In the present circuit, even if the switch 25 is opened by the user just before the voltage across capacitor 42 reaches the firing potential of bilateral silicon trigger switch 44, the relatively high capacitor voltage will rapidly discharge through bleed-off resistor 32. Thus, even though the user may soon thereafter close switch 25 to again operate the power tool, the charge across the capacitor 42 upon that closure of the switch will in all likelihood be at or very near zero volts. As a result, the charging of the capacitor 42 during the first half-cycle after closure of switch 25 will occur from substantially zero volts so that the phase angle, during which the triac 26 is conductive, is no greater during the first half-cycle than during subsequent half-cycles. This discharge path for the capacitor voltage when the switch is opened virtually eliminates the abrupt change in motor torque produced in previous control circuits caused by residual charge remaining on the capacitor.

Thus, the use of a semiconductor trigger device 44 which has a negligible voltage drop thereacross in the conductive state, and the use of a bleed-off resistor 32 to remove residual charge on the capacitor 42 when the power tool 20 is turned off, have significantly alleviated the tool kick problem of prior variable speed control circuits. This improvement has been accomplished without a significant increase in the number of components in the control circuit and without significantly increasing the cost of the power tool.

Figure 3:
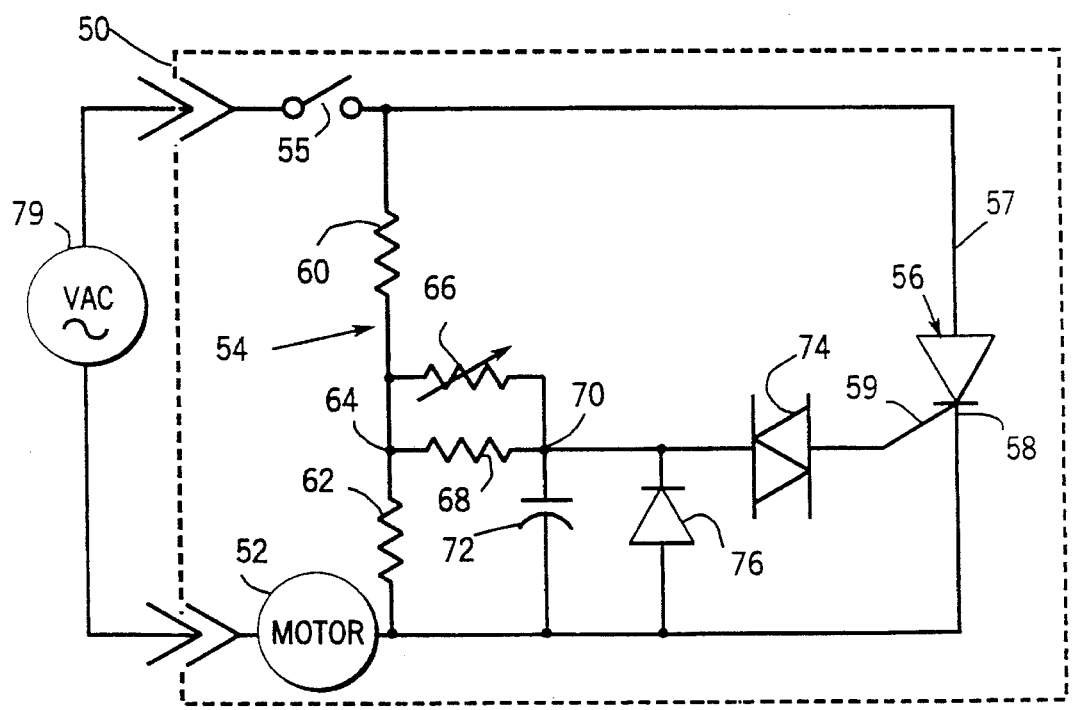
FIG. 3 is a schematic diagram of another embodiment of a control circuit according to the present invention.

FIG. 3 illustrates an embodiment of the present invention which is referred to as a half-wave version in that an SCR is used as the semiconductor switch and current is applied to the motor only during half-cycles of the same polarity, i.e. every other half-cycle of the supply line voltage.

Hand-held power tool 50 is driven by an electric motor 52 that is controlled by a variable speed control circuit 54 which includes a manually operated switch 55 to turn on and off motor 52. The switch 55 is connected to the motor 52 by a silicon controlled rectifier (SCR) 56 having an anode 57 connected to the switch and a cathode 58 connected to one terminal of the motor. The SCR 56 also has a gate, or control, electrode 59, which when driven by a low current, determines the conductivity in the SCR between the anode 57 and the cathode 58.

A voltage divider, formed by resistors 60 and 62, is connected directly across the anode and cathode of SCR 56. A first node 64 between resistors 60 and 62 is coupled to a second node 70 by a variable resistor 66 and a trimmer resistor 68 in parallel. A capacitor 72 is directly connected between the second node 70 and the SCR cathode 58. A diode 76 has an anode connected to the cathode of the SCR 56 and the cathode of diode 76 is connected directly to the second node 70.

A conventional semiconductor trigger device, such as a diac 74, a silicon trigger switch or a silicon unilateral switch, has its conduction path connected between the second node 70 and the gate electrode 59 of the SCR 56. In some applications of the half-wave variable speed control circuit 54, a silicon unilateral switch may be preferred as the semiconductor trigger device, with its gate coupled by a bias resistor to the SCR anode 57. Unlike the triac based control circuit shown in FIG. 2, a conventional diac 74 or other type of semiconductor trigger device, which does not have substantially a zero voltage drop across it in the conductive state, can be utilized. This is because the capacitor 72 is discharged during half-cycles of the supply line voltage when the SCR 56 is nonconducting, as will be described.

The operation of the half-wave control circuit 54 in FIG. 3 also avoids the power tool kick problems produced by prior speed control circuits. Assume that when the user closes switch 55 the alternating voltage from the source 79 is in a positive half-cycle. This results in the voltage at the second node 70 increasing in a positive direction. Reference herein to the voltage level and changes in voltage at the second node 70 and across capacitor 72 are with reference to the cathode 58 of SCR 56. The firing of the SCR 56 is not dependent upon its trigger characteristic, but rather is dependent upon the firing potential of diac 74. When the voltage at the second node 70 reaches a positive voltage level which is equivalent to the firing potential of diac 74, the diac becomes conductive discharging the positive charge of the capacitor as current into the gate electrode 59 of the SCR. This places SCR 56 in the conductive state sending current from source 79 to the motor 52. As is characteristic of thyristors, SCR 56 will remain conductive until the alternating current goes to zero, at which point it will turn off and remain off until once again triggered.

When the SCR 56 turns off, the residual voltage across capacitor 72 results in the second node being at a positive voltage level due to the diac conductivity characteristics. Conventional diac 74 typically triggers at about 30–40 volts and in the conductive state has a forward voltage drop of about 20 volts. This significant voltage drop across the conventional diac 74 in the conductive state, leaves the second node 70 at a significant residual voltage level (e.g. about 20 volts) when the SCR turns off.

During the next, or negative, half-cycle of the supply voltage, the SCR 56 will be reversed biased wherein the anode is at a negative potential with respect to the cathode 58. This reversing of the supply line voltage results in current flowing through diode 76 and resistors 60, 66 and 68. The residual positive voltage that remains across capacitor 72 will be reduced to a very small negative voltage as determined by the forward voltage drop across diode 76. This resultant voltage level typically will be less than one volt, which for practical purposes is equivalent to the zero volt level which was across capacitor 72 when the user initially closed switch 55. This voltage level during the negative half-cycles is insufficient to fire the diac 74, and even if the diac was to fire, the SCR 56 could not turn on since it is reversed biased. At the completion of the negative half-cycle of the supply line voltage, node 70 will have a negative potential between zero and one volt.

Thereafter, the supply line voltage once again goes through a positive half-cycle and the capacitor 72 begins charging from the negligible, small negative voltage level. The charging continues until the voltage at the second node 70 reaches a positive level equivalent to the firing potential of diac 74 at which point the SCR 56 will once again be turned on. The amount of time that it takes for the second node 70 to reach the firing potential of diac 74 practically never will be less during the first positive half-cycle of the supply line voltage than during each subsequent positive half-cycle. Therefore, by eliminating the residual charge on the capacitor 72 during negative half-cycles of the supply line voltage, the present control circuit 54 has alleviated one cause of the motor speed jump which occurred in previous control circuits.

When the user opens switch 55 to turn off the power tool 50, the residual charge on capacitor 72 is discharged through resistors 62, 66 and 68 in a relative rapid manner. Thus, by providing bleed-off resistor 62, the capacitor has a very high likelihood of charging from a zero voltage level each time switch 55 closes, even in instances when the time between opening and closing the switch is relatively short.

By using a semiconductor trigger device to fire the SCR and diode 76 to remove residual charge on capacitor 72 during each negative half-cycle of the supply line voltage, and by providing bleed-off resistor 62 to create a discharge path when the power tool is turned off, the half-wave variable speed control circuit 54 has alleviated motor start-up jump problems encountered in previous control circuits.

We claim:

1. In a hand-held power tool having an electric motor and a pair of power terminals for connection to a source of alternating electricity, a variable speed control circuit comprising:

a switch which is operable by a user of the power tool;

a triac having a gate electrode, first and second electrodes and a conduction path between the first and second electrodes with conductivity of the conduction path being controlled by voltage applied to the gate electrode, and wherein the conduction path, said switch and the motor are connected in series between the pair of power terminals;

a trigger node;

a semiconductor trigger device having a first terminal directly connected to the gate electrode of said triac and a second terminal directly connected to said trigger node;

a manually variable resistor connected between the first electrode of said triac and said trigger node;

a capacitor directly connected between the second electrode of said triac and said trigger node;

a bleed-off resistor connected between the second electrode of said triac and said trigger node to provide a path for discharging said capacitor when said switch is open; and a diode and a resistor connected in series between said trigger node and the second electrode of said triac to charge said capacitor at a different rate during positive half-cycles of the alternating electricity than during negative half-cycles, thereby minimizing a difference between a setting of said manually variable resistor at which the motor starts and a setting at which the motor stops.

2. The hand-held power tool as recited in claim 1 wherein the variable speed control circuit further comprises a trimmer resistor connected in parallel across said manually variable resistor wherein resistance of said trimmer resistor can be varied to adjust a time constant of an RC circuit formed by said manually variable resistor and said capacitor.

3. In a hand-held power tool having an electric motor and a pair of power terminals for connection to a source of alternating electricity, a variable speed control circuit comprising:

a switch which is operable by a user of the power tool;

a triac having a gate electrode, first and second electrodes and a conduction path between the first and second electrodes with conductivity of the conduction path being controlled by current applied to the gate electrode, and wherein the conduction path, said switch and the motor are connected in series between the pair of power terminals;

a voltage divider connected directly across the first and second electrodes of said triac, and consisting of first and second resistors connected directly in series with a first node therebetween;

a second node;

a variable resistor operable by the user and directly connected between the first node and said second node;

a capacitor directly connected between the second electrode of said triac and said second node; and a bidirectional semiconductor trigger device having a first terminal directly connected to the gate electrode of said triac, and having a second terminal directly connected to said second node.

4. The hand-held power tool as recited in claim 3 wherein the variable speed control circuit further comprises a diode and a resistor connected in series directly between said second node and the first electrode of said triac.

5. The hand-held power tool as recited in claim 3 herein the variable speed control circuit further comprises trimmer resistor connected in parallel directly across said variable resistor wherein resistance of said trimmer resistor can be varied to adjust a time constant of an RC circuit formed by said variable resistor and said capacitor.

6. The hand-held power tool as recited in claim 3 wherein said bidirectional semiconductor trigger device is selected from a group consisting of a bilateral silicon trigger switch and a silicon bidirectional switch.

7. The hand-held power tool as recited in claim 3 wherein said bidirectional semiconductor trigger device in a conductive state has a voltage drop between the first and second terminals of less than two volts.

8. In a hand-held power tool having an electric motor and a pair of power terminals for connection to a source of alternating electricity, a variable speed control circuit comprising:

a switch which is operable by a user of the power tool;

a silicon controlled rectifier having gate electrode, a cathode, an anode and a conduction path between the anode and cathode with conductivity of the conduction path controlled by current applied to the gate electrode, and wherein the conduction path, said switch and the motor are connected in series between the pair of power terminals;

a voltage divider connected directly across the anode and cathode of said silicon controlled rectifier, and consisting of first and second resistors connected directly in series with a first node therebetween;

a second node;

a variable resistor manually operated by the user and directly connected between the first node and said second node;

a capacitor directly connected between the cathode of said silicon controlled rectifier and said second node;

a diode connected directly between said second node and the cathode of said silicon controlled rectifier, and being forward biased when said silicon controlled rectifier is reverse biased; and a semiconductor trigger device having a first terminal directly connected to the gate electrode of said silicon controlled rectifier, and having a second terminal directly connected to said second node.

9. The hand-held power tool as recited in claim 8 wherein the variable speed control circuit further comprises trimmer resistor connected in parallel across said variable resistor wherein resistance of said trimmer resistor can be varied to adjust a time constant of an RC circuit formed by said variable resistor and said capacitor.

10. The hand-held power tool as recited in claim 8 wherein said semiconductor trigger device is selected from a group consisting of a diac, a silicon trigger switch and a silicon unilateral switch.

* * * * *